UNITED STATES PATENT OFFICE 2,573,607

HYDROXYALKYL FLUORENYL AMINES

George Rieveschl, Jr., Grosse Pointe Woods, Mich., assignor to Parke, Davis & Company, Detroit, Mich., a corporation of Michigan No Drawing. Application April 11, 1949,
Serial No. 86,869

8 Claims. (Cl. 260—576)

This invention relates to a new class of amino alcohols and to methods for obtaining the same. More specifically, the invention relates to substituted 9-fluorenyl β-hydroxyalkyl amines and their acid addition salts. The free base compounds of the present invention have the formula,

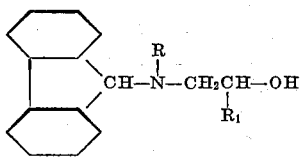

where R is a lower alkyl or lower alkenyl radical and R₁ is hydrogen or methyl.

In accordance with the invention the new amino alcohols may be obtained as a free base having the formula given above or as an acid addition salt of the base with an inorganic or organic acid. Some examples of the salts which may be prepared by the methods hereinafter described are the hydrochloride, hydrobromide, hydroiodide, sulfate, sulfamate, phosphate, acetate, citrate, oxalate, succinate, benzoate, tartrate, picrate, phthalate, maleate, oleate and the like.

It has been found that the compounds of the present invention may be obtained by several different methods. For example, they may be prepared by the reaction of a 9-fluorenyl halide and an alkyl or alkenyl β-hydroxyalkyl amine. The reaction is preferably carried out in an inert organic solvent such as benzene, toluene or xylene. A modification of this process involves the use of an alkaline material to react with the mineral acid formed during the reaction. When the reaction is carried out in the presence of such materials a smaller quantity of amine is required since the amine is not removed from the reaction by salt formation. In general, when no acid binding agent is employed, it is preferable to use about two or more equivalents of amine for each equivalent of the 9-fluorenyl halide. Some of the alkaline substances which can be used in the process are alkali metal hydroxides, oxides, alcoholates, carbonates, bicarbonates, acetates and the like. The alkaline earth metal hydroxides, oxides and carbonates may also be used.

Alternatively, a 9-fluorenyl alkyl or alkenyl amine can be reacted with a β-hydroxalkyl halide under substantially the same conditions as described above for the reaction of a 9-fluorenyl halide with an alkyl or alkenyl β-hydroxyalkyl amine. Still another method for obtaining these new tertiary amino alcohols consists in reacting ethylene oxide or 1,2-propylene oxide with a 9-fluorenyl alkyl or alkyenyl amine in an inert organic solvent such as methanol, ethanol, benzene, toluene, xylene, dioxane and the like.

The substituted 9-fluorenyl β-hydroxyalkyl amines and their acid addition salts are useful in the preparation of other organic compounds and find particular use in the preparation of sympatholytic agents.

The invention is illustrated by the following examples.

*Example 1.—9-florenyl methyl β-hydroxyethyl amine*

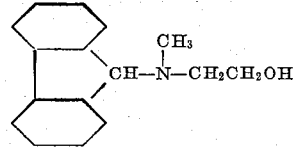

A mixture consisting of 13.5 g. of methyl ethanol amine and 25 g. of anhydrous potassium carbonate in 50 cc. of xylene is heated to boiling and 30 g. of 9-fluorenyl chloride in 150 cc. of xylene added slowly over a period of one and one-half hours with stirring. After the addition has been completed the mixture is refluxed for five hours, cooled, poured into water and the organic layer separated. The organic layer is extracted with dilute hydrochloric acid, the acidic aqueous extracts made alkaline with sodium hydroxide and the mixture extracted with ether. The ether extract is dried over potassium carbonate and the ether distilled in vacuo to obtain the desired 9-fluorenyl methyl β-hydroxyethyl amine.

*Example 2.—9-fluorenyl ethyl β-hydroxyethyl amine*

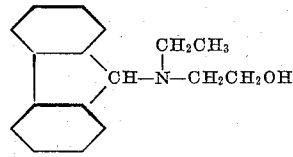

A mixture consisting of 16 g. of ethyl ethanol amine and 20.8 g. of anhydrous potassium carbonate in 40 cc. of xylene is heated to boiling and 30 g. of 9-fluorenyl chloride dissolved in 150 cc. of xylene added slowly to the first solution with stirring. After the addition has been completed, about one and one-half hours, the reaction mixture is refluxed for an additional eight and one-half hours, cooled and diluted with ether. The reaction mixture is washed with saturated sodium chloride solution and then the organic layer extracted with two portions of 2.5 N hydrochloric acid. The acidic aqueous extract is made strongly alkaline with sodium hydroxide, extracted with ether and the ether extract dried. Distillation of the ether yields the desired 9-fluorenyl ethyl β-hydroxyethyl amine as a pale yellow liquid.

About 0.2 cc. of the amino alcohol prepared above is added to 2 cc. of a saturated alcoholic picric acid solution and the resulting mixture diluted with ether. The crystals which separate are collected and purified by recrystallization from methanol. The melting point of the picrate salt thus obtained is 136° C.

Treatment of the free base of the amino alcohol with an excess of hydrogen chloride or hydrogen bromide in isopropanol or ether yields the hydrochloride and hydrobromide salts respectively.

*Example 3.—9-fluorenyl isopropyl β-hydroxyethyl amine*

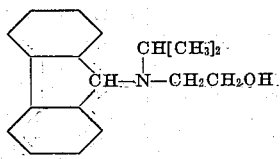

18.6 g. of isopropyl ethanol amine and 25 g. of potassium carbonate in 50 cc. of xylene is heated to boiling and 30 g. of 9-fluorenyl chloride in 150 cc. of xylene added to the solution with stirring over a period of two hours. After the addition has been completed, the reaction mixture is refluxed for eight hours and then poured into 300 cc. of water. The xylene layer is separated, washed with water, the aqueous extracts discarded and then the organic layer extracted with an excess of dilute hydrochloric acid. The acidic aqueous extract is extracted once with ether, the ether layer discarded and the aqueous solution made alkaline with 20 g. of sodium hydroxide. The yellow, oily product which rises to the surface of the solution is taken up in ether, the ether solution dried and the ether distilled to obtain the desired free base of 9-fluorenyl isopropyl β-hydroxyethyl amine.

*Example 4.—9-fluorenyl n-butyl β-hydroxyethyl amine*

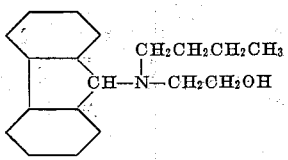

21.7 g. of 9-fluorenyl chloride dissolved in 125 cc. of xylene is added with stirring to a solution of 29 g. of butyl ethanol amine dissolved in 50 cc. of xylene at refluxing temperature. After the addition has been completed, about two hours, the reaction mixture is heated for an additional twelve hours. The reaction mixture is cooled, the hygroscopic crystals of butyl ethanol amine hydrochloride removed by filtration and the filtrate treated with 300 cc. of water. The organic layer is diluted with ether, removed, washed with fresh water and then extracted with an excess of dilute hydrochloric acid. The aqueous acidic extract is made alkaline with sodium hydroxide and extracted with ether. The ether extract is dried and the ether removed by distillation in vacuo to obtain the desired 9-fluorenyl n-butyl β-hydroxyethyl amine.

*Example 5.—9-fluorenyl allyl β-hydroxyethyl amine*

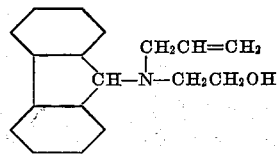

A solution of 101 g. of 9-fluorenyl chloride in 200 cc. of benzene is added to a refluxing mixture composed of 55 g. of allyl ethanol amine and 55 g. of anhydrous sodium carbonate in 300 cc. of benzene over a period of forty-five minutes. After the addition has been completed the mixture is refluxed for six hours, cooled and treated with 55 cc. of water. The organic layer is separated, extracted with several portions of dilute hydrochloric acid and the acidic extracts made alkaline with 20% potassium hydroxide solution. The free base of the product is extracted with ether, the ether extracts dried and the ether distilled. The residue consists of the desired 9-fluorenyl allyl β-hydroxyethyl amine.

*Example 6.—9-fluorenyl n-hexyl β-hydroxyethyl amine*

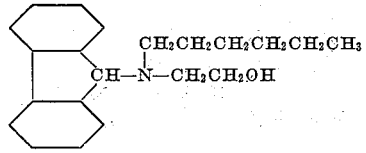

A solution of 235 g. of 9-fluorenyl bromide in 100 cc. of toluene is added slowly to a refluxing solution of 300 g. of n-hexyl ethanol amine in 100 cc. of toluene and the solution refluxed for a total of six hours. The mixture is cooled and the n-hexyl ethanol amine hydrobromide removed by filtration. Distillation of the solvent from the filtrate yields the desired free base of 9-fluorenyl n-hexyl β-hydroxyethyl amine as a light colored oil.

*Example 7.—9-fluorenyl methyl β-hydroxypropyl amine*

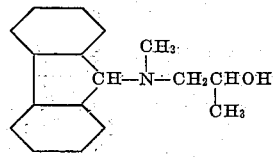

A mixture consisting of 124 g. of 9-fluorenyl bromide and 43 g. of methyl β-hydroxypropyl amine in 150 cc. of xylene is refluxed for six hours. The mixture is cooled, the insoluble methyl β-hydroxypropyl amine hydrobromide removed by filtration and the organic filtrate treated with about 500 cc. of water. The organic layer is separated, extracted with dilute hydrochloric acid and the aqueous extracts made alkaline with 10% sodium hydroxide solution. The free base of the desired 9-fluorenyl methyl β-hydroxypropyl amine which separates from the alkaline solution is extracted with ether, the ether solution dried and the ether removed by distillation in vacuo.

*Example 8.—9-fluorenyl allyl β-hydroxypropyl amine*

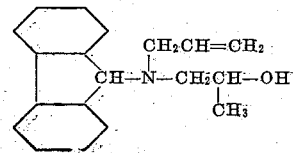

245 g. of 9-fluorenyl bromide in 200 cc. of benzene is added dropwise to a refluxing solution consisting of 120 g. of allyl β-hydroxypropyl amine and 75 g. of anhydrous potassium carbonate in 150 cc. of benzene. After the addition has been completed the resulting mixture is refluxed for six hours, cooled and treated with 500 cc. of water. The organic layer is separated, extracted with dilute hydrochloric acid and the aqueous extracts made alkaline by the addition of 10% potassium hydroxide solution. The free base which separates is taken up in ether, the ether solution dried and the ether evaporated to obtain the desired 9-fluorenyl allyl β-hydroxypropyl amine.

What I claim is:

1. A compound of the class consisting of a free base and its acid addition salts, said free base having the formula,

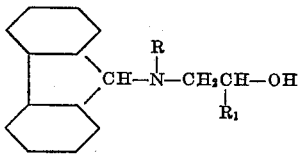

where R is a member of the class consisting of lower alkyl and allyl radicals and $R_1$ is a member of the class consisting of hydrogen and methyl.

2. A compound of the class consisting of a free base and its acid addition salts, said free base having the formula

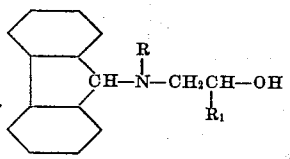

where R is lower alkyl and $R_1$ is a member of the class consisting of hydrogen and methyl.

3. A compound of the formula,

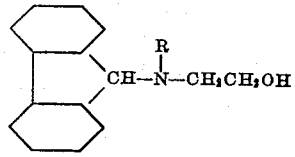

where R is a lower alkyl radical.

4. 9-fluorenyl ethyl β-hydroxyethyl amine.
5. 9-fluorenyl isopropyl β-hydroxyethyl amine.
6. 9-fluorenyl methyl β-hydroxyethyl amine.
7. 9-fluorenyl n-butyl β-hydroxyethyl amine.
8. 9-fluorenyl n-hexyl β-hydroxyethyl amine.

GEORGE RIEVESCHL, JR.

No references cited.